Oct. 31, 1933.   T. G. LOUIS   1,932,978
MAGNETO
Filed July 3, 1931   3 Sheets-Sheet 1
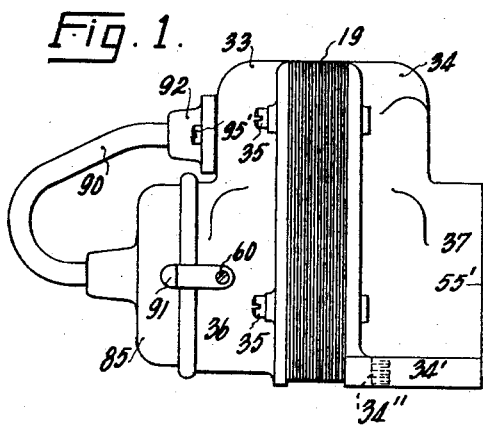
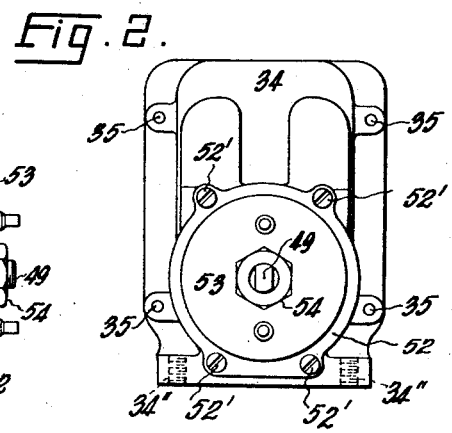
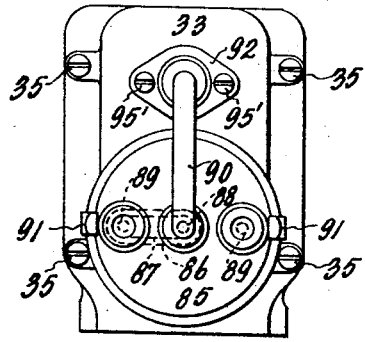
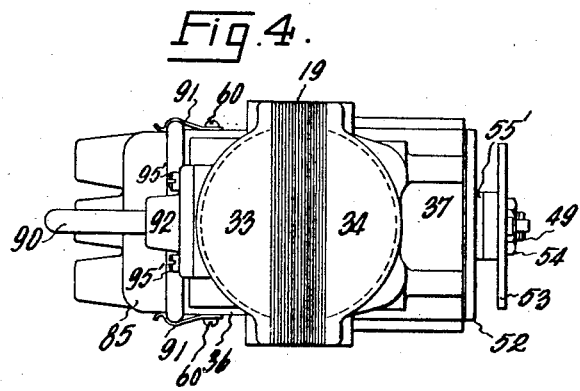
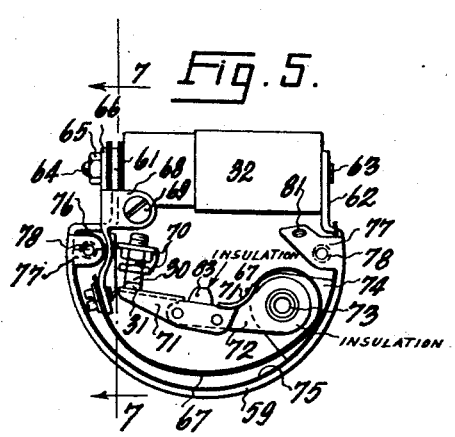
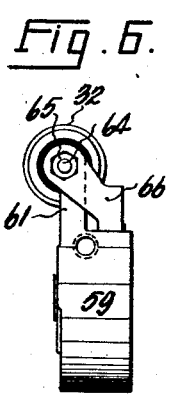
INVENTOR.
TERRENCE G. LOUIS
BY Chapin & Neal
ATTORNEYS.

Oct. 31, 1933.  T. G. LOUIS  1,932,978
MAGNETO
Filed July 3, 1931  3 Sheets-Sheet 2

INVENTOR.
TERRENCE G. LOUIS
BY Chapin & Neal
ATTORNEYS.

Oct. 31, 1933.  T. G. LOUIS  1,932,978
MAGNETO
Filed July 3, 1931   3 Sheets-Sheet 3
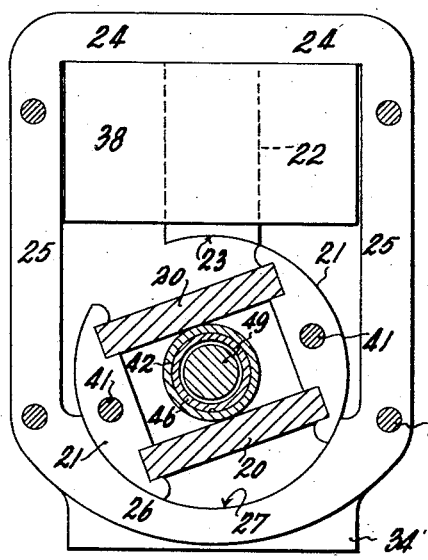
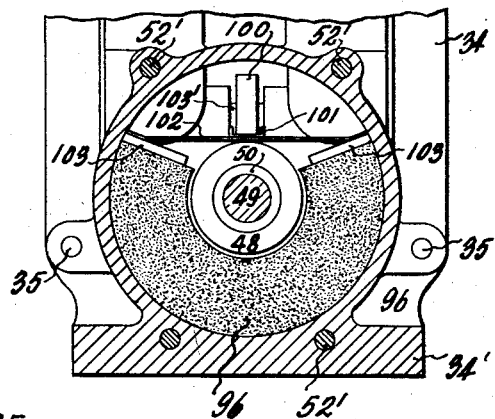
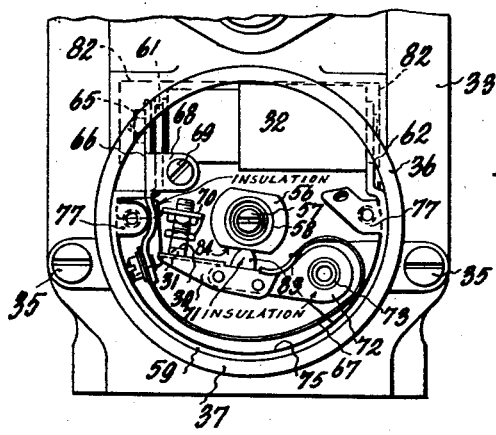
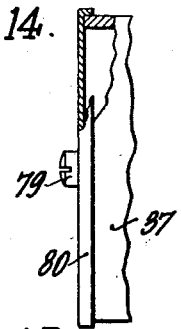
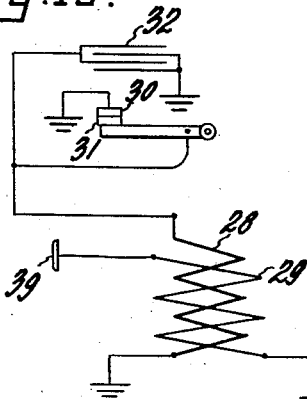
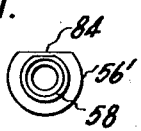
INVENTOR.
TERRENCE G. LOUIS
BY Chapin & Neal
ATTORNEYS.

Patented Oct. 31, 1933

1,932,978

UNITED STATES PATENT OFFICE 1,932,978

MAGNETO

Terrence G. Louis, West Springfield, Mass., assignor to Wico Electric Company, West Springfield, Mass., a corporation of Massachusetts Application July 3, 1931. Serial No. 548,534

13 Claims. (Cl. 171—209)

This invention relates to improvements in magnetos. These improvements are primarily designed for magnetos of the rotary inductor type although some of them may be useful in magnetos of other types, such for example as the type in which the inductor is oscillated rather than rotated continuously in one direction.

The general objects of the invention are to provide a highly efficient magneto in an exceedingly small compact structure of light weight; to provide a magneto construction susceptible to manufacture in quantity at low unit cost; to provide a substantially fool proof structure in which all working parts are completely enclosed and protected against injury and in which the lubrication problem is taken care of automatically; and to provide a construction in which all working parts can be assembled and adjusted at the factory, leaving nothing whatever for the engine manufacturer to do other than bolt the magneto in place and couple it to an engine shaft.

A particular object, and one most important as contributing to the attainment of some of the above objects and particularly to the desired result of securing great effectiveness from a small amount of magnetic material, relates to the provision of a magnetic rotor which cooperates with a stationary, laminated structure having a coil-carrying core, in such a way that flux is first built up in such structure in a path extending through the core and coil and then decreased with great rapidity by the expedient of shunting the magnetic rotor by another part of said structure in a low reluctance path wholly outside said core and coil. The laminated structure has substantially opposed surfaces between which the rotor turns. One of such surfaces is on said core and is of relatively small peripheral extent. The other is of relatively large peripheral extent and large enough so that both pole shoes of the rotor can be simultaneously covered in part by said surface for the purpose of shunting the source of flux. The pole shoes of the rotor are angularly spaced so that both of them can never be covered at the same time, even in part, by said core surface and so that, in two ranges of movement of the rotor in each revolution thereof, said surfaces are bridged across and interconnected by the magnetic rotor. At all other ranges in the movement of the rotor its magnetic source is shunted by said larger surface. This arrangement has proved highly effective, resulting in quick and large flux changes in the core. Exceedingly short magnets may be used, enabling a rotor of small diameter and enabling the surrounding laminated structure to be correspondingly reduced in size and weight. Reversals of flux through the core, such as were formerly thought desirable to secure great effectiveness, have been entirely avoided.

Another object of the invention is to provide a housing for all parts of the magneto, such housing being made up in part by the above laminated structure, which completely surrounds the coils and rotor, and in part by two end frame members between which said laminated structure is clamped.

Another object of the invention is to provide in a completely enclosed magneto, such for example as that above set forth, a mounting for the rotor carried by one of the end members, and a normally closed opening in the other end member through which the rotor and, if desired, the interrupter mechanism, may be easily and quickly removed without the necessity of taking apart the enclosing structure.

A further object of the invention is to provide a magneto made up of a plurality of independent units, each complete in itself, such as a housing and frame unit including the stationary elements of the magnetic circuit and a support for the coils and a rotor bearing, a magnetic rotor unit, a combined interrupter and condenser unit and, where multi-cylinder ignition is required, a distributor unit.

There are many other features contributing to the attainment of the above general objects. These features will best appear as the detailed description proceeds, and they will be pointed out in the appended claims.

The invention will be disclosed for illustrative purposes with reference to the accompanying drawings, in which:—

Fig. 1 is a side elevational view of a magneto embodying my invention;

Figs. 2 and 3 are end elevational views taken from the right and left, respectively, of Fig. 1;

Fig. 4 is a top plan view of the magneto;

Fig. 5 is an end elevational view of the combined interrupter and condenser unit;

Fig. 6 is a side elevational view taken from the left hand end of Fig. 5;

Fig. 7 is a sectional view taken on the line 7—7 of Fig. 5;

Figs. 9, 10 and 11 are cross sectional views showing the stationary and movable elements of the magnetic circuit in different relative positions;

Fig. 12 is a fragmentary cross sectional view taken on the line 12—12 of Fig. 8;

Fig. 13 is a fragmentary end elevational view of the distributer end of the machine with the distributer removed;

Fig. 14 is a fragmentary view, taken similarly to Fig. 1, showing an end cover for use in place of the distributer casing in cases where no distributer is neded for the magneto;

Fig. 15 is a view of an interrupter cam for use in the magneto in cases where only one spark per revolution is required; and Fig. 16 is a diagrammatical view of the electrical connections of the magneto.

Figure 9:
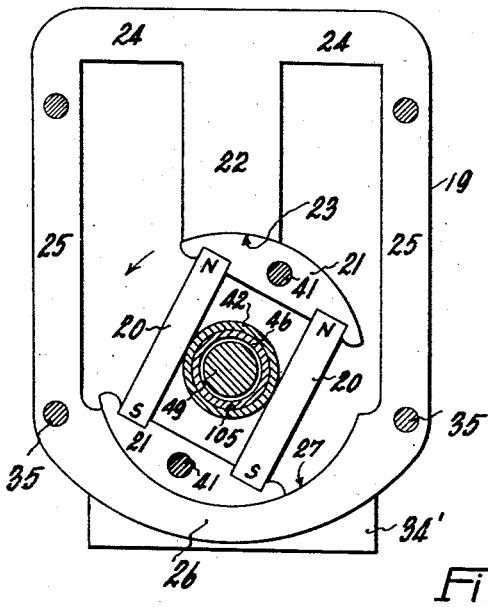
Figure 8:
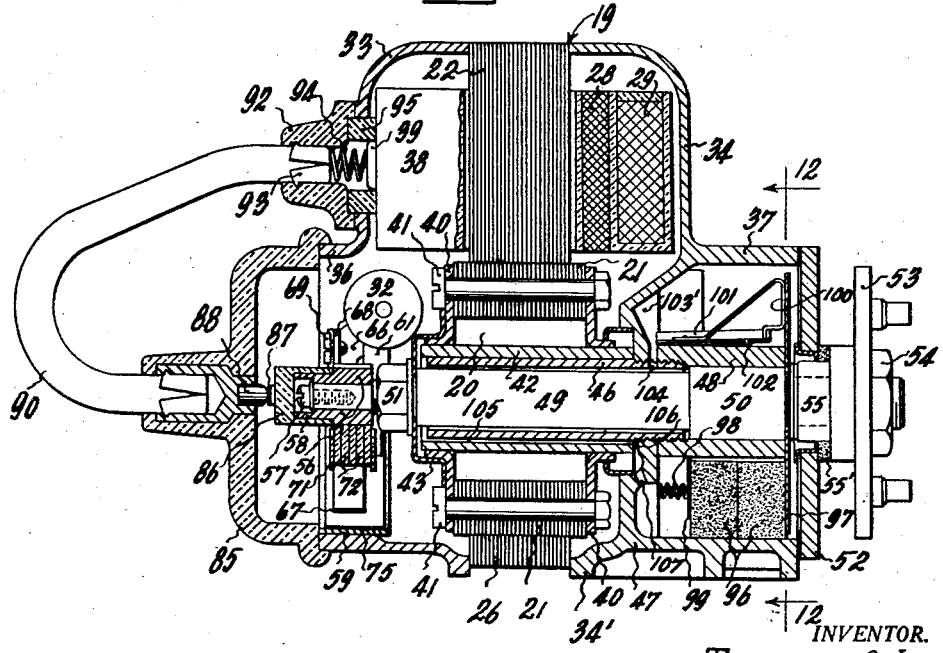
Fig. 8 is a sectional elevational view of the magneto.

Referring first to the elements of the magnetic circuit, these, as shown in Figs. 8 and 9, comprise a stationary element made up of a plurality of soft iron laminations 19 suitably bound together, and a movable element,—a magnetic rotor,—comprising a single source of magnetic flux (in this instance two short bar magnets 20) and a pair of laminated pole shoes 21, connected one to each polar extremity of the magnetic source. The stationary laminated element affords a central core 22, having one end formed wtih an arcuate surface 23 (Fig. 9) of relatively short peripheral extent for cooperation successively but never simultaneously with the pole shoes. It will be clear that, with the preferred and illustrated arrangement, the pole shoes, being diametrically opposed, are peripherally separated to such an extent that both shoes cannot ever simultaneously be covered, even in part, by the core surface 23.

The other end of the core 22 has an extension comprising an outwardly extending horizontal part 24, a downwardly extending vertical part 25 and, from the lower end of the latter, an inwardly extending part 26 to underlie the rotor. The connection of part 26 to the upper end of the core is preferably, although not necessarily, made as shown by two sets of parts 24 and 25, forming a divided magnetic circuit, in which case the cross sectional area of each part 24 and 25 need be but substantially half the cross sectional area of the core. This affords a symmetrical arrangement and enables the rotor and the coils which, as will appear, are carried by core 22, to be completely surrounded by the laminated structure. Functionally, however, one set of parts 24 and 25 will suffice for the purpose of magnetically connecting the upper end of core 22 to the part 26. This part has an arcuate surface 27 to cooperate with the pole shoes of the rotor and such surface is much larger in peripheral extent than the surface 23 (slightly over four times as large as shown) and larger (say fifty per cent larger) in peripheral extent than the pole shoes 21.

Figure 10:
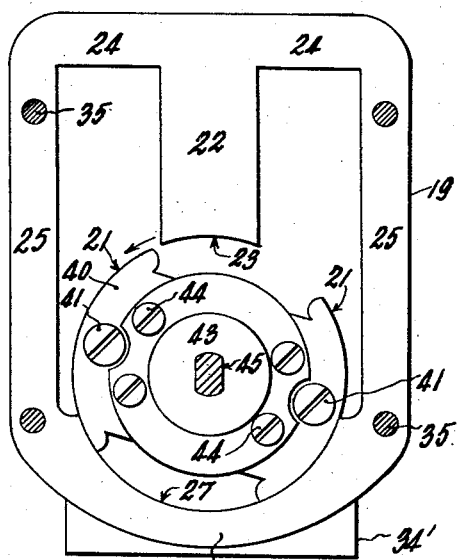

The arrangement is such that the magnetic rotor, twice during each revolution, moves through a range in which the surfaces 23 and 27 are directly bridged and magnetically interconnected. Flux from the magnets 20 then flows through core 22 and through the coils thereon. Fig. 11 shows the rotor as just entering one such range; Fig. 9 shows the rotor in such range with the core end 23 fully covered by one pole shoe; and Fig. 10 shows the rotor shortly after the rotor has left such range. The arrangement is also such that when the rotor lies outside either of such ranges its magnets 20 are shunted by the surface 27, which simultaneously and partially covers both pole shoes 21 and establishes a shunting path of low reluctance through the part 26.

The magnets 20 always have a closed circuit, except for the air gaps between the rotor and the surfaces 23 and/or 27, and these gaps are preferably made as small as possible, approaching closely to what may be termed "rubbing clearance". The shoes just clear said surfaces. In connection with the constantly available closed circuit for magnet 20, note that in Fig. 11 the surface 27 is still partially covering both pole shoes at the time when one shoe is about to move into covering relation with core end 23. Also from Fig. 10 it will be seen that the surface 27 will partially cover both pole shoes before one of them moves out of covering relation with core end 23. In other words, the rotor moves into position to establish a magnetic circuit through the core 22 before the shunt afforded by part 26 is broken, and this shunt is reestablished before said circuit is broken.

It is to be noted that throughout a large range in each half revolution of the rotor, one of its shoes 21 is covering the core end 23. There is an angular interval of slightly over 140 degrees between the position in which the leading end of a shoe 21 meets the right hand end of surface 23 and the position in which the trailing end of such shoe leaves the left hand end of said surface. During a substantial part of this interval, say slightly more than 110 degrees, the magnet is unshunted and available to build up flux in core 22, even against the retarding influence of a closed circuited primary winding. The action, it will be seen, is to build up flux in core 22 and then cause it to decrease with extreme rapidity by shunting the magnets through a shorter path of less reluctance than that which includes the core. Flux is built up as far as possible in the core and then suddenly knocked out by the low reluctance shunting path. A quick, sharp, extensive and effective flux change results and this single unidirectional flux change is all that is utilized for the production of the spark. It is not necessary to resort to the expedient, formerly thought desirable for such purposes, of passing flux first in one direction and then in an opposite direction through the core and utilizing the total flux change for the production of the spark. Effective results can be obtained by the described arrangement.

It will be noted that the magnetic circuit through core 22 is made and broken twice during each revolution. Either or both of such flux changes may be utilized for generating an electromotive force. As shown, both changes are utilized because the illustrated magneto is for multi-cylinder ignition. Obviously, one such change only may be utilized, when desired.

The electrical provisions include primary and secondary coils 28 and 29, respectively, mounted one within the other and encompassing core 22. As usual, the primary coil is connected in an electrical circuit which may be opened and closed by relatively movable breaker points 30 and 31. This circuit will be clear from Fig. 16. It will be seen that a condenser 32 is bridged across the breaker points. The secondary coil is connected to the ignition system, having one terminal grounded, as indicated, and the other terminal adapted for connection to a spark plug or a distributer, as the case may require. The breaker points, operated by means later to be described, are open when a pole shoe moves into covering relation with the core end 23. They may be closed say at a position such as shown in Fig. 9, after the pole shoe has completely covered the core end. A large part of the flux will by then have been built up in core 22 but flux will continue to build up in the core, even though the primary coil is short circuited, and a considerable additional angular interval of movement of the rotor is available for this work. The breaker points open shortly after the pole shoe leaves the core end 23, say at about the position shown in Fig. 10. The short circuited primary coil will restrain decrease in flux through the core while the pole shoe moves far enough away from the core end 23 to create an effective gap. Then when the points open, the magnetic circuit through the core will be suddenly broken and at a time when a shunt path has been established for the magnet. There results a complete collapse of flux in the core and a sharp, sudden change, producing a very effective ignition spark. It should be noted that when the breaker points open, the neutral zone only of one magnet lies adjacent but still materially spaced from the core end 23. In cases where two sparks per revolution of the rotor are desired, the breaker points will be opened and closed at diametrically opposite points from the opening and closing points, above described.

Referring next to the magneto structure, the stationary laminations described are clamped between two end members 33 and 34 (Fig. 1) by a series of through bolts 35. These members, with the laminations, afford a complete enclosure for all working parts of the magneto, as will be clear from Fig. 8. The members 33 and 34 are roughly semi-circular near their upper ends, as viewed in plan (see Fig. 4), to encompass the coils and, near their lower ends, have substantially cylindrical portions 36 and 37, respectively, which align with the axis of the magnetic rotor (Fig. 8). These portions 36 and 37, which are open at their outer ends, are normally closed by means to be described. The coils 28 and 29 are mounted on core 22 in any suitable way. As shown, the coil 29 is contained in an annular housing 38 of insulating material, such as bakelite, and coil 28 fits in the core of this housing. The ungrounded high tension terminal of coil 29 is shown at 39, in the form of a small metal button attached to housing 38. The members 33 and 34 may advantageously be die castings and made of light weight, non-magnetic metal. One of them, as 34, is formed to provide a base 34' with threaded holes 34'' to enable its attachment to a supporting bracket.

The rotor parts 20 and 21 are clamped between two plates 40 of non-magnetic material by bolts 41 (Figs. 8 and 10). The pole shoes 21 are recessed to receive and closely fit the polar extremities of the magnets 20 (Fig. 9) and are held in assembled relation by the plates and bolts described. The two magnets form one source of flux and their "north" poles are connected to one shoe 21 and their "south poles" to the other shoe. The plates 40 are interconnected by a tubular shaft 42 (Fig. 8) pressed into or otherwise suitably fixed in the central hubs of the plates. The opening in one of these hubs is closed by a disc 43, secured to plate 40 by screws 44 (Fig. 10). This disc has a central hole 45 of roughly rectangular form through which a correspondingly formed part of the drive shaft extends, as will appear.

The rotor is supported entirely from the end frame member 34 by means of a hollow stud 46 (Fig. 8), suitably fixed near one end in a partition wall 47 of the member. As shown, the stud is screwed into said wall and projects therebeyond to receive a cylindrical member 48, a portion of which is threaded on the stud and acts as a lock nut to hold the stud securely in place. The remainder of member 48 serves as a bearing for the rotor drive shaft 49, a portion 50 of which is journalled therein. The tubular shaft 42 of the rotor is journalled on the exterior of the hollow stud 46 and the shaft 49 extends through this same stud and has a reduced portion shaped to fit opening 45 for an operable driving engagement with the rotor. A nut 51, threaded on such reduced portion of shaft 49, serves to clamp the rotor disc 43 against a shoulder of the shaft. The other end of shaft 49 extends through a cover 52 which closes the outer end of cylindrical portion 37 and is held in place by screws 52' (Fig. 2). On the outer end of shaft 49 is fixed one element 53 of a universal joint or any other suitable means for coupling the shaft to a power source, such as a shaft of an internal combustion engine. Element 53 is held in place on shaft 49 by a nut 54. Interposed between the element 53 and the enlarged portion 50 of shaft 49 is a bushing 55 which is clamped in place by nut 54. This bushing is grooved as shown to sling off oil and minimize the likelihood of oil escaping through cover 52 and a gasket 55' is applied, as shown, as a further precaution against escape of oil.

The interrupter mechanism is contained with the end frame member 33 and all parts of this mechanism, with the exception of its driving cam, are assembled together with a condenser 32, on a common frame which is mounted in a manner to permit quick and convenient removal, in the cylindrical portion 36. The interrrupter cam, designated 56 (Fig. 8), is suitably secured to the inner end of shaft 49, which extends to the left beyond nut 51 for this purpose. Such cam is held in place by a screw 57 mounted in the hollow hub 58 of the cam. The combined interrupter and condenser unit is shown separately from the magneto in Figs. 5, 6 and 7. Its frame consists of a substantially semi-circular band 59 of metal, bent to fit the lower half of the bore 36 and held in place therein by screws, such as 60 (Fig. 1). From the upper end of this band are inwardly offset and upstanding lugs 61 and 62, between which the condenser 32 is supported. The grounded terminal 63 of the condenser fits in a hole in lug 62 and is thereby connected to the metallic frame of the magneto. The other terminal 64 passes through lug 61 and is suitably insulated therefrom as shown. Connected to this terminal 64 and held in place by a nut 65 thereon, is a depending metal piece 66 to the lower end of which is fixed a spring 67. A lug 68 on piece 66 carries a terminal screw 69 whereby to secure the end of the wire leading from the ungrounded end of the primary coil. Struck inwardly from the back edge of band 59 is a lug 70 which carries the fixed breaker point 30. The movable breaker point 31 is fixed to the metal part 71 of a lever 72, the remainder of which is of insulating material, as indicated. This lever is mounted to turn on, and is insulated from a stud 73 fixed to a lug 74, struck inwardly from the rear edge of band 59. The spring 67 connects with the metal part 71 of lever 72 and serves the double purpose of an electrical conductor and a return spring for holding the breaker points in contact. An insulating strip 75 is applied to the inner face of band 59 to prevent spring 67 from contacting with it and this strip has inturned ears 76 to insulate the conducting piece 66 from lug 70 and from the left hand one of a pair of diametrically opposed lugs 77. These lugs have threaded holes 78 to receive the attaching screws 79 of the metal cover 80 shown in Fig. 14, and one of them has an extra threaded hole 81 which may be used in attaching a ground wire thereto.

The unit just described is slipped in place in the magneto housing through the end of the portion 36. The unit is initially tilted and the condenser inserted in advance of the curved frame 59. After the unit has been inserted far enough to carry the condenser beyond the cylindrical portion 36, the frame 59 may then be swung back into vertical position and secured in place by the screws 60. The portion 36 has outward extensions, forming recesses 82 to accommodate the end portions of the condenser. After this unit has been put in place, the cam 56 may be placed on and secured to shaft 49. This cam acts on an insulated, upwardly projecting part 83 of lever 72. The cam has two diametrically opposed flat surfaces 84. When either lies adjacent to projection 83, lever 72 will be enabled to move under the force of spring 67 to engage the breaker points 30 and 31. At other times the breaker points will be held open.

In case only one spark per revolution is desired, the cam 56' shown in Fig. 15 is used. Such cam has a single surface 84, allowing the breaker points to close and open only once during each revolution, as for example when the rotor is positioned as in Figs. 9 and 10 respectively. Thus, one only of the two makes and breaks of the magnetic circuit through core 22 is utilized for the production of a spark. The change in magnetic flux effected through core 22 by movement of the rotor while the breaker points are open, is a gradual one. The flux built up in core 22 needs to be held by a closed circuited primary winding until the pole shoe has moved sufficiently far away from core 22 in order to secure a sharp effective break. Without this restraining influence, the flux is gradually decreased through the core and the necessary quick sudden change to produce an effective spark is lacking. Before the pole shoe leaves core 22, it becomes shunted. There is then a divided path for the flux and more and more is diverted through the shunting path, resulting in a gradual rather than a sharp transition. Thus, no effective spark is produced while a pole shoe traverses the core end 23, provided that the breaker points remain open during the entire traverse.

The distributor includes a case of insulating material, serving as a cover for the open end of portion 36 and a brush arm 86, having a hollow hub which telescopes over the hollow hub 58 in the usual or any suitable manner for an operable driving engagement between these parts. The brush proper consists of a flat spring 87 suitably fixed to the arm 86. This brush spring, at its inner end, constantly presses against a central contact 88 in case 85 and intermittently engages with its outer end, first one and then the other of two diametrically opposed contacts 89, adapted for connection to an ignition system. The central contact 88 is connected by a wire 90 to the high tension terminal 39. The distributor case is held in place by spring clips 91 of conventional form,—such clips being fixed at one end to member 33 by the described screws 60.

A desirable means of effecting a thoroughly weather-proof and effectively insulated joint between wire 90 and high tension terminal 39 is shown in Fig. 8. The end of wire 90 is fixed in a socket formed in an insulating piece 92 and closely fits and fills said socket. On the end of the wire is a metallic retaining clip 93, of conventional form, which is in electrical connection with the wire. A spring 94, or any other suitable means, on clip 93 presses against terminal 39 and maintains good contact between it and the wire. Encompassing the terminal button 39 is a washer 95 of rubber or equivalent material having good insulating as well as water-proofing properties. This washer passes through an opening in the metallic end frame 33 and extends therebeyond and into a recess in the piece 92. This piece is secured to casing 33 by screws 95' and, in the act of clamping it in place, the washer 95 is compressed between piece 92 and coil housing 38 so as to make a tight and sealed joint with each,—forming a duct for spring 94 and the button 39 into which water cannot enter. The compression of the washer, as described, causes it to bulge out at a point intermediate its ends, and press against the hole in casing 33 to make a sealed joint.

The lubricating provisions for the magneto will next be described. The lower part of the space within the portion 37 of end member 34 and between the cover 52 and partition 47 forms a reservoir for lubricant. Felt pieces 96 are placed in this reservoir and become saturated with the lubricant. An elevating disc 97 fixed to shaft 49 (being clamped between the bushing 55 and enlarged part 50 by nut 54), travels against the outer face of one of these felt pieces. One or more springs 98, acting between the partition 47 and a follower plate 99, constantly press the felts against the lubricant-elevating disc 97. Lubricant, elevated by this disc, is removed therefrom during the upper part of travel of the disc, by a stationary scraper 100 and flows down this scraper into a stationary trough 101. This scraper is fixed to the trough and the trough is fixed to a cross piece 102 (Fig. 12) which rests upon and spans the space between two radial, inwardly-extending and downwardly-converging ribs 103 formed integrally with the portion 37. The trough slopes toward partition 47 and delivers lubricant into a vertical recess 103' therein. At the base of this recess is a hole 104 extending into the interior of stud 46. Lubricant can flow in both directions inside this stud. That which flows to the right as viewed in Fig. 8, will lubricate the journal portion 50 of shaft 49 and its bearing 48. Lubricant returns by gravity from shaft 49 and its bearing directly to the reservoir in a path to the right of disc 97. The lubricant flowing to the left inside stud 46 cannot escape because of the closure disc 43 on the rotor but it will flow out of the left hand end of stud 46 and downwardly, dropping into the projecting end of hollow shaft 42 and then flowing to the right through a groove 105 in the exterior of stud 46 to lubricate the tubular rotor shaft and its bearing. The lubricant passing out of groove 105, drops into a vertical groove 106 in partition 47 and is conducted to a hole 107 through which it flows back into the reservoir. The magneto is thus provided with a self-contained, circulatory lubricating system for automatically taking care of the lubrication of all moving parts. Provisions are made against escape of lubricant from the system so that the reservoir will not require frequent replenishment. It is to be noted that the lubricating system is well isolated from the coils, interrupter and other electrical parts which might be injuriously effected by oil.

The operation of the magneto and its important functional features have already been fully set forth in the foregoing description. The magnetic circuit is an exceedingly efficient one and with the two small magnets of exceptionally short length, highly effective results are obtained. The reduction in magnet length enables a reduction in rotor diameter and this in turn enables a reduction in dimensions of the stationary laminated structure which encompasses the rotor. A very small and compact magneto results. For example, it is shown full size in Fig. 8 and from this, one can visualize and appreciate the work that has been done in the design of parts to yield as much as possible in the way of results from a small amount of material.

In addition, the magneto is so designed that it may be manufactured in quantities at low unit cost. The stationary laminations and those of the pole shoes are simple stampings, as usual. The magnets, being straight, require simply to be cut to length from bar stock. These magnets and pole shoes are then fitted together and bolted between the side plates 40, after which the tubular shaft 42 is pressed in place and the closure disc applied. The combined frame and housing structure is equally simple, consisting as it does essentially of the two end members 33 and 34, which hold between them the stationary laminations and with the latter afford a complete enclosure for all parts. The coils as one unit, are applied to the core prior to fastening the three housing members together and so also is the hollow stud support 46 for the rotor. Then the rotor,—a separately constructed unit,—can be slipped into place on stud 46 by way of the open tubular end 36. The drive shaft is then slipped in through the opposite end 37 and connected with the rotor. Access to the connecting nut 51 is had by way of the open end 36 for making this connection. Then the interrupter and condenser,—another separately constructed unit,—is slipped in through the end 36 as already described, and fastened in place. The cam 56 is then put in place on shaft 49 and connected thereto by the screw 57. The open end 36 may be closed by the cover 80 of Fig. 14, if a distributer is not used. Otherwise, the distributer brush 86 is slipped over the slightly flattened hub 58 (see Fig. 15) of cam 56 and thereby connected therewith and with shaft 49 in an operable driving engagement. The distributer case is then slipped in place to close the open end 36 and is held in position by clips 91. The wire 90 and the terminal piece 92 and associated parts are then applied as described. The felts 96, scraper 100 and trough 101 are assembled through the open end 37, after which the elevating disc 97 is placed on shaft 49. The cover 52 is then fastened in place to close the open end 37, after which the parts 55, 55', 53 and 54 are applied in the order named. Thus, the design admits of an easy assembly of parts and of easy access to and removal of parts when required. The unit construction and the simplicity of construction of each unit, combined with the convenience of assembly of parts of each unit and of the units themselves, make the magneto particularly well suited for manufacturing purposes.

While the magneto is attractive from the manufacturer's standpoint, it presents important advantages to the user. It is small, compact, of light weight and designed to give long and efficient service without requiring particular attention or care. Lubrication is automatically attended to and the former troubles due to excess or insufficient lubrication are eliminated. The vital parts of the magneto are all completely enclosed and protected against mechanical injury and the ingress of water, oil and dirt. The magneto is thus calculated to have a long, useful life. In addition to all these important considerations, the user gets an exceedingly efficient magneto in which a minimum of magnetic and electrical material is so effectively utilized as to yield a maximum in the way of results.

The invention has been disclosed herein, in an embodiment at present preferred, for illustrative purposes, but the scope of the invention is defined by the appended claims rather than by the foregoing description.

What I claim is:

1. In a magneto, a relatively stationary coil receiving element of magnetic material having substantially opposed surfaces of different peripheral extent, a relatively rotatable element comprising a single pair of pole shoes and at least one bar magnet of relatively short length extending across from one shoe to the other in a direction transversely of the axis of rotation of said element and interconnecting them and constituting a single source of magnetic flux, said shoes being of opposite polarity and angularly spaced so that both cannot cooperate at the same time with the smaller of said surfaces and so that both can cooperate with the larger of said surfaces to afford a shunting path of low reluctance for said source at all positions of said element except those when both surfaces are directly and magnetically interconnected by said element, said rotor serving during each rotation to establish flux in one direction through said coil and then exclude it as it moves into shunting relation with said larger surface and thereafter to reestablish flux through said coil in the opposite direction and then to again exclude it as it again moves into shunting relation with said larger surface.

2. In a magneto, a magnetic rotor, a core with one end of which said rotor cooperates, primary and secondary windings on said core, said rotor comprising a single pair of pole shoes angularly spaced to such an extent that both cannot cooperate at the same time with said core end and at least one bar magnet of relatively short length extending across from one shoe to the other in a direction transverse to the axis of rotation of said rotor and constituting a single source of magnetic flux which interconnects said shoes and renders them of opposite polarity, an extension from the other end of said core terminating with an arc shaped surface adjacent the path of movement of said shoes and located so that when one shoe covers said core end the other is covered by said surface to establish a magnetic circuit through said core, said surface being of sufficient angular extent to simultaneously cooperate with both shoes and furnish a shunting path of low reluctance for said source at all positions of the rotor except those in which said circuit is established relatively movable breaker points, an electrical circuit including said points and primary winding, and means for closing said points after the rotor has moved into one of its positions for establishing said magnetic circuit and holding them closed until the rotor moves out of such position and into shunting relation with said larger surface and then opening said points.

3. In a magneto, a magnetic rotor comprising a single pair of substantially diametrically opposed pole shoes and a single bar-magnet source of magnetic flux interconnecting them, said bar-magnet being of relatively short length and extending directly across from one shoe to the other in a direction transverse to the axis of rotation of said rotor, a core having one end formed for cooperation successively with said shoes, an electrical winding on said core, and an extension from the other end of said core having a surface for cooperation with said shoes, said surface being opposed to said core end and of sufficient angular extent to simultaneously cover in part both shoes at all positions of the rotor except those when one shoe covers said core end at least in part and the other shoe covers said surface in part.

4. In a magneto, a magnetic rotor comprising a single pair of substantially diametrically opposed pole shoes and a single bar-magnet source of magnetic flux interconnecting them, said bar-magnet being of relatively short length and extending directly across from one shoe to the other in a direction transverse to the axis of rotation of said rotor, a core having one end formed for cooperation successively with said shoes, an electrical winding on said core, and extensions from the other end of said core encompassing said winding and rotor and having an arc shaped surface opposed to said core end and adapted for cooperation with said shoes, said surface being of sufficient angular extent to simultaneously cover in part both shoes at all positions of the rotor except those when one shoe covers said core end at least in part and the other shoe covers said surface in part.

5. In a magneto, a stationary coil-receiving element of magnetic material having opposed rotor-cooperating surfaces one of which is substantially four times the peripheral extent of the other, primary and secondary windings on said element, a rotor comprising substantially diametrically opposed pole shoes interconnected by a single source of magnetic flux, said source comprising at least one bar-magnet of relatively short length extending directly across from one shoe to the other in a direction transverse to the axis of rotation of said rotor, said shoes being greater in peripheral extent than the smaller of said surfaces and less in peripheral extent than the larger of said surfaces, said rotor adapted throughout a certain range of its rotation to bridge across between said surfaces and establish a magnetic circuit through said element and coil and in all other positions to establish by simultaneous cooperation of both shoes with said larger surface a shunting path of low reluctance for said source through said element but outside said coil, relatively movable breaker points, an electrical circuit including said points and primary winding, and means for closing said points after the rotor has moved into one of its positions for establishing said magnetic circuits and holding them closed until the rotor moves out of such position and into shunting relation with said larger surface and then opening said points.

6. In a magneto, a stationary coil-receiving element of magnetic material presenting substantially diametrically-opposed rotor-cooperating surfaces of different peripheral extent, and a magnetic rotor comprising a single pair of substantially diametrically opposed pole shoes interconnected by a permanent magnet which is of relatively short length and extends directly across from one shoe to the other in a direction transverse to the axis of rotation of the rotor, the larger of said surfaces being of sufficient extent to magnetically interconnect both pole shoes and establish a shunting path of low reluctance for said source in all positions of the rotor except those in which it directly and magnetically interconnects both surfaces to establish a magnetic circuit through said coil, said rotor when moved to break said circuit having its magnet shunted by said larger surface to accelerate decrease of flux through the coil, and said magnet being then located so that its neutral point lies adjacent the smaller surface.

7. In a magneto, a magnetic rotor comprising pole shoes interconnected by a single permanent magnet source of magnetic flux, a core having one end formed for successive cooperation with said shoes and an extension from the other end extending at least part way around the rotor and having a surface opposed to said first named core end and formed for cooperation with said shoes, said surface being greater in peripheral extent than the peripheral distance between the pole shoes, primary and secondary windings on said core, relatively movable breaker points, an electrical circuit including said primary coil and breaker points, said rotor throughout a certain range of movement serving to bridge across between said surface and first-named core end and establish a magnetic circuit through said core and its extension and throughout another range of movement to have its shoes simultaneously covered in part by said surface to shunt said source, and means for closing said breaker points while the rotor moves in the first named range and for opening them after the rotor leaves such range and has entered the second named range.

8. In a magneto, a magnetic rotor, a core with one end of which said rotor cooperates, primary and secondary windings on said core, said rotor comprising a single pair of pole shoes angularly spaced to such an extent that both cannot cooperate at the same time with said core end and a single permanent magnet source of magnetic flux interconnecting said shoes and rendering them of opposite polarity, an extension from the other end of said core terminating with an arc shaped surface adjacent the path of movement of said shoes and located so that when one shoe covers said first named core end the other is covered by said surface to establish a magnetic circuit through said core, said surface being of sufficient angular extent to simultaneously cooperate with both shoes and furnish a shunting path of low reluctance for said source at all positions of the rotor except those in which said circuit is established, relatively movable breaker points, an electrical circuit including said points and primary coil, and means for closing said points after the rotor has moved into one of its positions for establishing said magnetic circuit and holding them closed until the rotor moves out of such position and into shunting relation with said larger surface and then opening said points.

9. In a magneto, stationary and movable elements effective on relative movement to produce a change of flux and cause the generation of an electromotive force, end frame members connected to the stationary element and cooperating therewith to provide a complete enclosure, a support for the movable element fixed to one of said members and extending toward the other, said other member having an opening therein large enough to enable the movable element to be withdrawn through it, readily removable means normally closing said opening, a unit comprising an interrupter mechanism and a condenser mounted in said other member and removable as a unit through said opening, and a detachable connection for driving said interrupter from said movable element accessible through said opening when said closing means is removed.

10. In a magneto, stationary and movable elements effective on relative movement to produce a change of flux and cause the generation of an electromotive force, end frame members connected to the stationary element and cooperating therewith to provide a complete enclosure, a support for the movable element fixed to one of said members and extending toward the other, said other member having an opening therein large enough to enable the movable element to be withdrawn through it, a unit comprising an interrupter mechanism having relatively stationary and movable parts and a condenser, said unit mounted in said other member and removable through said opening, a distributer casing normally closing said opening, a distributer brush, a detachable driving connection between said brush and the movable part of the interrupter mechanism, and a detachable connection for driving the movable part of the interrupter mechanism from said movable element, said last named connection accessible through said opening after the distributer casing and brush have been removed.

11. In a magneto, stationary and movable elements effective on relative movement to produce a change of flux and cause the generation of an electromotive force, end frame members connected to the stationary element and cooperating therewith to provide a complete enclosure, a hollow stud fixed near one end to one of said members and projecting toward the other of said members and serving to support said movable element, a drive shaft extending through the first named member and through said hollow stud, a detachable driving connection between said shaft and movable element beyond the other end of said stud, said second named member having an opening therein through which said connection is accessible and through which the movable element may be removed when said connection is detached, said shaft being then withdrawable through said first named member, and conveniently removable means normally closing said opening.

12. In a magneto, stationary and movable elements effective on relative movement to produce a change of flux and cause the generation of an electromotive force, end frame members connected to the stationary element and cooperating therewith to provide a complete enclosure, a hollow stud fixed near one end to one of said members and projecting toward the other of said members and serving to support said movable element, a drive shaft extending through the first named member and through said hollow stud, a detachable driving connection between said shaft and movable element beyond the other end of said stud, said second named member having an opening therein through which said connection is accessible and through which the movable element may be removed when said connection is detached.

13. In a magneto, a metallic casing having an opening, a coil therein having a high tension terminal button located adjacent said casing and in line with said opening, an annular washer having insulating and waterproofing properties fitting in said opening and encompassing said button, a member of insulating material having a socket, means for clamping said member to said casing and compressing said washer between the member and said coil to insulate said terminal and protect it from the weather, and a high tension wire having an end received in said socket and connecting with said button.

TERRENCE G. LOUIS.